(12) United States Patent
Cai et al.

(10) Patent No.: US 8,165,394 B2
(45) Date of Patent: Apr. 24, 2012

(54) RECONSTRUCTION OF IMAGE IN A BAYER PATTERN

(75) Inventors: Xiongfei Cai, Beijing (CN);
Feng-Hsiung Hsu, Cupertino, CA (US)

(73) Assignee: Microsoft Corporation, Redmond, WA (US)

( * ) Notice: Subject to any disclaimer, the term of this patent is extended or adjusted under 35 U.S.C. 154(b) by 888 days.

(21) Appl. No.: 12/212,792

(22) Filed: Sep. 18, 2008

(65) Prior Publication Data

US 2010/0067789 A1 Mar. 18, 2010

(51) Int. Cl.
*G06K 9/00* (2006.01)
(52) U.S. Cl. ........................................................ 382/166
(58) Field of Classification Search .................. 382/166, 382/167, 233, 162, 165; 348/272, 273, 280
See application file for complete search history.

(56) References Cited

U.S. PATENT DOCUMENTS

| | | | |
|---|---|---|---|
| 6,392,699 B1 | 5/2002 | Acharya | |
| 6,832,009 B1 * | 12/2004 | Shezaf et al. | 382/300 |
| 7,071,978 B2 | 7/2006 | Hunter et al. | |
| 7,072,508 B2 | 7/2006 | Dance | |
| 7,194,129 B1 * | 3/2007 | Reinhart | 382/167 |
| 2002/0186309 A1 * | 12/2002 | Keshet et al. | 348/272 |
| 2005/0084150 A1 | 4/2005 | Shan et al. | |
| 2007/0058050 A1 | 3/2007 | Innocent | |
| 2007/0071362 A1 | 3/2007 | Milanfar et al. | |
| 2008/0012953 A1 | 1/2008 | Yang et al. | |

OTHER PUBLICATIONS

Malvar, et al., "High-Quality Linear Interpolation for Demosaicing of Bayer-Patterned Color Images", IEEE International Conference on Acoustics, Speech, and Signal Processing, 2004, Proceedings. (ICASSP '04), Publication Date: May 17-21, 2004, vol. 3, on pp. iii-485-8 vol. 3.
Li, et al., "New Edge-Directed Interpolation", IEEE Transactions on Image Processing, vol. 10, No. 10, Oct. 2001, pp. 1521-1527.
Perko, et al., "Geometrical Accuracy of Bayer Pattern Images", Conference proceedings ISBN 80-903100-7-9 WSCG2005, Jan. 31-Feb. 4, 2005, Short Papers, pp. 117-120.
Kimmel, Ron, "Demosaicing: Image Reconstruction from Color CCD Samples", IEEE Transactions on Image Processing, vol. 8, Issue 9, Sep. 1999, pp. 1221-1228.
Patti, et al., "Artifact Reduction for Set Theoretic Super Resolution Image Reconstruction with Edge Adaptive Constraints and Higher-Order Interpolants", IEEE Transactions on Image Processing, vol. 10, No. 1, Jan. 2001, pp. 179-186.
Hirakawa, et al., "Adaptive Homogeneity-Directed Demosaicing Algorithm", IEEE Transactions on Image Processing, vol. 14, No. 3, Mar. 2005, pp. 360-369.

* cited by examiner

*Primary Examiner* — Duy M Dang
(74) *Attorney, Agent, or Firm* — The Law Office of Michael E. Kondoudis

(57) ABSTRACT

Architecture for decoding (demosaicing) a source image and performing reconstruction directly from the Bayer pattern to reduce memory size and improve communication bandwidth. The architecture can be easily implemented in hardware such as in field programmable gate arrays (FPGAs) and application-specific integrated circuits (ASICs).

18 Claims, 10 Drawing Sheets

302

$$R(X_t, Y_t) = R(x,y) = \begin{bmatrix} 1 - \frac{\Delta x}{2} - \frac{\Delta y}{2} + \frac{\Delta x \Delta y}{4} \\ \frac{\Delta x}{2} - \frac{\Delta x \Delta y}{4} \\ \frac{\Delta y}{2} - \frac{\Delta x \Delta y}{4} \\ \frac{\Delta x \Delta y}{4} \end{bmatrix}' \cdot \begin{bmatrix} R(X,Y) \\ R(X+2,Y) \\ R(X,Y+2) \\ R(X+2,Y+2) \end{bmatrix}$$

304

$$R(X_t, Y_t) = R(x,y) = \begin{bmatrix} \frac{1}{2} - \frac{\Delta x}{2} - \frac{\Delta y}{4} + \frac{\Delta x \Delta y}{4} \\ \frac{1}{2} + \frac{\Delta x}{2} - \frac{\Delta y}{4} - \frac{\Delta x \Delta y}{4} \\ \frac{\Delta y}{4} - \frac{\Delta x \Delta y}{4} \\ \frac{\Delta y}{4} + \frac{\Delta x \Delta y}{4} \end{bmatrix}' \cdot \begin{bmatrix} R(X-1,Y) \\ R(X+1,Y) \\ R(X-1,Y+2) \\ R(X+1,Y+2) \end{bmatrix}$$

306

$$R(X_t, Y_t) = R(x,y) = \begin{bmatrix} \frac{1}{2} - \frac{\Delta x}{4} - \frac{\Delta y}{2} + \frac{\Delta x \Delta y}{4} \\ \frac{\Delta x}{4} - \frac{\Delta x \Delta y}{4} \\ \frac{1}{2} - \frac{\Delta x}{4} + \frac{\Delta y}{2} - \frac{\Delta x \Delta y}{4} \\ \frac{\Delta x}{4} + \frac{\Delta x \Delta y}{4} \end{bmatrix}' \cdot \begin{bmatrix} R(X,Y-1) \\ R(X+2,Y-1) \\ R(X,Y+1) \\ R(X+2,Y+1) \end{bmatrix}$$

308

$$R(X_t, Y_t) = R(x,y) = \begin{bmatrix} \frac{1}{4} - \frac{\Delta x}{4} - \frac{\Delta y}{4} + \frac{\Delta x \Delta y}{4} \\ \frac{1}{4} + \frac{\Delta x}{4} - \frac{\Delta y}{4} - \frac{\Delta x \Delta y}{4} \\ \frac{1}{4} - \frac{\Delta x}{4} + \frac{\Delta y}{4} - \frac{\Delta x \Delta y}{4} \\ \frac{1}{4} + \frac{\Delta x}{4} + \frac{\Delta y}{4} + \frac{\Delta x \Delta y}{4} \end{bmatrix}' \cdot \begin{bmatrix} R(X-1,Y-1) \\ R(X+1,Y-1) \\ R(X-1,Y+1) \\ R(X+1,Y+1) \end{bmatrix}$$

*FIG. 3*

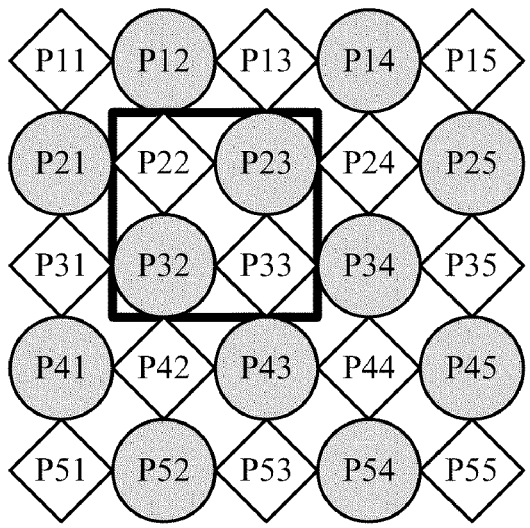
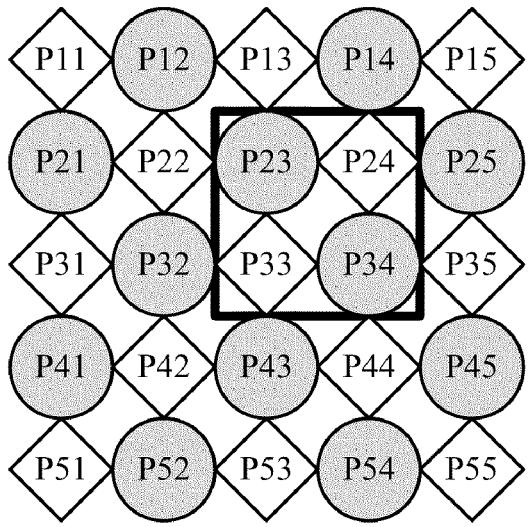
FIG. 5

RECONSTRUCTION OF IMAGE IN A BAYER PATTERN

BACKGROUND

Single and multi-sensor cameras are predominant in image or video capture systems. The cameras typically employ CCD or CMOS sensors that utilize a Bayer pattern color filter array (where each pixel only contains one color value). When using a Bayer pattern color filter array, the captured image is a mosaic of red, green, and blue (RGB) colors where each pixel is missing two of the three color values. Accordingly, these missing color values need to be interpolated to obtain an approximation of the full RGB values for each pixel to provide a richer output image.

Vendors can provide different methods to decode the source image to the full RGB patterns in the output image, including bilinear reconstruction, nearest neighbor, cubic, cubic spline, etc., all which have different computational speed and accuracy tradeoffs. As handheld devices become smaller, the amount of available memory and computing power can become limiting factors while consumer demand remains high for better image and video quality.

However, many of the reconstruction processes for images are based on the full RGB pattern; therefore, memory size and communication bandwidth remain big issues and are not easy to implement in hardware.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture decodes (demosaics) a source image and performs reconstruction directly from the source mosaic pattern (e.g., Bayer) to the target mosaic pattern (e.g., Bayer) to reduce memory size and improve communication bandwidth. Moreover, the architecture can be easily implemented in hardware such as in field programmable gate arrays (FPGAs) and application-specific integrated circuits (ASICs).

The architecture employs multiple different algorithms for calculating the target pixel based on real and virtual source pixels based on the location of the source pixel. The algorithms apply to full red, blue and green base color patterns.

To the accomplishment of the foregoing and related ends, certain illustrative aspects are described herein in connection with the following description and the annexed drawings. These aspects are indicative of the various ways in which the principles disclosed herein can be practiced, all aspects and equivalents of which are intended to be within the scope of the claimed subject matter. Other advantages and novel features will become apparent from the following detailed description when considered in conjunction with the drawings.

BRIEF DESCRIPTION OF THE DRAWINGS

FIG. 3 illustrates the resulting equations of the above scenarios for red pixels.

FIG. 5 illustrates the scenarios for the green pixel reconstruction in a Bayer pattern.

DETAILED DESCRIPTION

Figure 1:
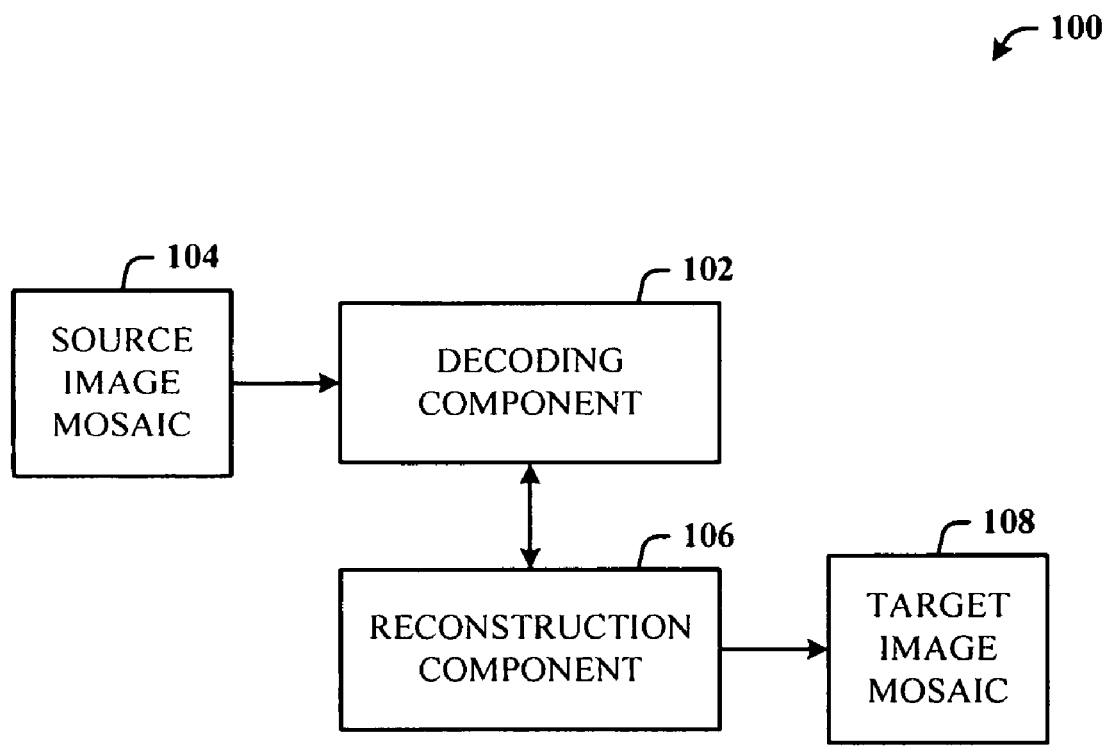
FIG. 1 illustrates a computer-implemented image processing system in accordance with the disclosed architecture.

In the bilinear reconstruction of full RGB patterns, each pixel has three color values related to red (R), green (G) and blue (B). In image/video frame reconstruction, the target pixel is reconstructed from real pixels of the source image/frame. Denoting T as the transform matrix and $(X_t, Y_t)$ the target pixel coordinates, the relevant pixel in the source image/frame is at the position (x, y). Since x and y are not likely to be integers, the source pixel value can be calculated by interpolating from four adjacent real pixels around the new position in source image/frame.

The following Equation Set 1 is a bilinear reconstruction method for full RGB patterns.

$$[x, y, 1]' = T \cdot [X_t, Y_t, 1]'$$

$$R(x, y) = \begin{bmatrix} 1 - \Delta x - \Delta y + \Delta x \Delta y \\ \Delta x - \Delta x \Delta y \\ \Delta y - \Delta x \Delta y \\ \Delta x \Delta y \end{bmatrix}' \cdot \begin{bmatrix} R(X, Y) \\ R(X+1, Y) \\ R(X, Y+1) \\ R(X+1, Y+1) \end{bmatrix}$$

$$G(x, y) = \begin{bmatrix} 1 - \Delta x - \Delta y + \Delta x \Delta y \\ \Delta x - \Delta x \Delta y \\ \Delta y - \Delta x \Delta y \\ \Delta x \Delta y \end{bmatrix}' \cdot \begin{bmatrix} G(X, Y) \\ G(X+1, Y) \\ G(X, Y+1) \\ G(X+1, Y+1) \end{bmatrix}$$

$$B(x, y) = \begin{bmatrix} 1 - \Delta x - \Delta y + \Delta x \Delta y \\ \Delta x - \Delta x \Delta y \\ \Delta y - \Delta x \Delta y \\ \Delta x \Delta y \end{bmatrix}' \cdot \begin{bmatrix} B(X, Y) \\ B(X+1, Y) \\ B(X, Y+1) \\ B(X+1, Y+1) \end{bmatrix}$$

where X=[x], Y=[y]; [x] means the largest integer that is smaller than x; $\Delta x = x - X$ and $\Delta y = y - Y$.

Many imagers (e.g., CMOS and CCD image/video sensors) use a Bayer pattern as the color filter array. Because of bandwidth or memory size limitation, it is sometimes desired to have the reconstruction outputs in the Bayer pattern the same as the Bayer pattern of the source image/frame. The relevant pixels in the source image/frame also use the four adjacent real pixels of the same color to interpolate the target pixel value. The interpolation method is similar to that described above for full RGB reconstruction.

Demosaicing (also referred to as mosaic decoding) interpolates a mosaic image in a Bayer pattern to an image in full RGB pattern. Bilinear interpolation can also be employed to do this. In bilinear interpolation, real values of real pixels are left untouched, and the interpolated color value is obtained from adjacent real pixel values of the same color. (The following set of equations (here, applied to the red (R) pixels) will be referred to generally herein as Equation Set 3.) For example, where a red pixel R8 in the target image maps to a center position of four surrounding real red pixels, the target red pixel R8 is interpolated by the simple average of the color values of the surrounding real pixels in the source image such that interpolated pixel R8=(R2+R4+R12+R14)/4. Similarly, for a green pattern target pixel that maps back to a position centered in four surrounding real green pixels, the target green pixel G8 is interpolated by the simple average of the values of the surrounding real green pixels in the source image such that interpolated green pixel G8=(G3+G7+G9+G13)/4.

Where the target pixel maps directly to the source pixel, interpolation is such that the value of the target pixel is equivalent to the value of the real source pixel; thus, for example, an interpolated blue pixel B8 in the target image is the same as the real pixel value such that B8=B8. Where the target pixel maps to a position between two adjacent real pixels, the target pixel R13 in the red pattern, for example, is interpolated as the simple average of the adjacent real red pixel values, such that R13=(R12+R14)/2.

The disclosed architecture facilitates reconstruction directly from the Bayer pattern, which improves the performance greatly while keeping the simplicity of implementation in hardware. Unlike reconstruction in full RGB patterns, reconstruction directly from the Bayer pattern facilitates a reduction in memory size and communication bandwidth.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a computer-implemented image processing system 100 in accordance with the disclosed architecture. The system 100 includes a decoding component 102 for decoding a source image mosaic 104 of pixels of a source image into source base color patterns, and a reconstruction component 106 for reconstructing target pixels in a target mosaic 108 of a target image directly from the source base color patterns.

As will be described herein, the mosaic of the source image and the mosaic of the target image can be Bayer patterns. The reconstruction component 106 selects an interpolation algorithm that calculates a color value for a target pixel based on a source pixel distribution that includes real and interpolated source pixels. The pixel distribution includes three interpolated source pixels and a real pixel, and applies to red and blue base color patterns. The pixel distribution can also include two interpolated source pixels and six real pixels, which applies to a green base color pattern.

In other words, the reconstruction occurs directly from the source mosaic to the target mosaic as a concurrent operation. The mosaics can be Bayer patterns such that the two processes of demosaicing and bilinear reconstruction are combined using equations that facilitate the direct reconstruction to provide better performance with nearly equal simplicity.

Figure 2:
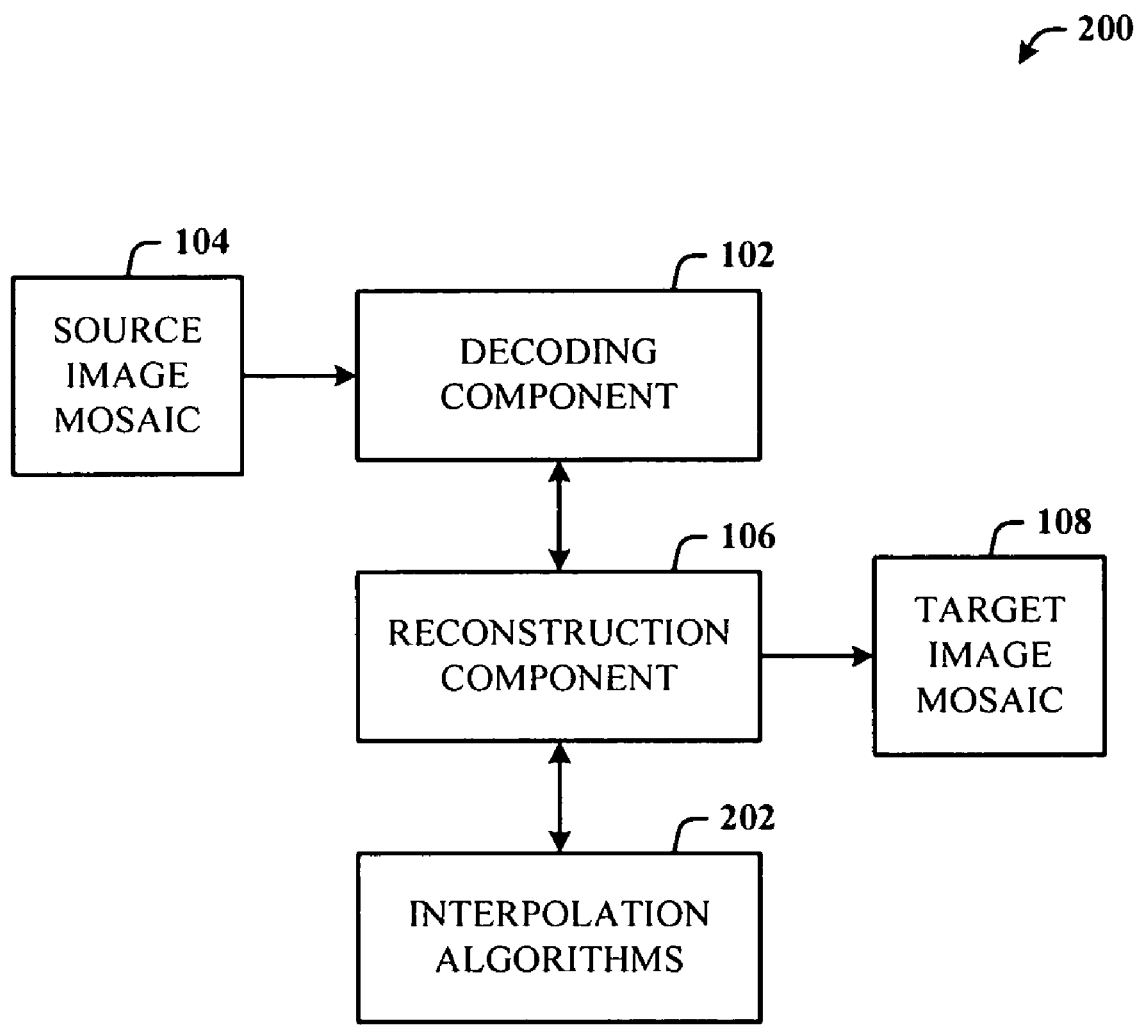
FIG. 2 illustrates a more detailed image processing system that employs interpolation algorithms for specific interpolation based on the position of the real pixels in the source mosaic.

FIG. 2 illustrates a more detailed image processing system 200 that employs interpolation algorithms 202 for specific interpolation based on the position of the real pixels in the source mosaic 104. The system 200 includes the decoding component 102 for decoding a source Bayer pattern of pixels of a source image into source base color patterns, and the reconstruction component 106 for reconstructing target pixels in a target mosaic of a target image directly from the source base color patterns to generate target pixels in a target Bayer pattern of a target image. The reconstruction component 106 selects one of the interpolation algorithms 202 that calculates an interpolated color value for a target pixel based on a real and interpolated pixel distribution in the base color patterns.

As is described herein below, the pixel distribution can include three interpolated source pixels and a real pixel for red and blue base color patterns. The pixel distribution can include two interpolated source pixels and six real pixels for a green base color pattern.

The description for the interpolation algorithms 202 is based on red, blue and green pixels; however, it is to be understood that other color spaces can be employed, such as for luma (Y) and chroma (Cr and Cb) components, for example.

The equations below are derived from the Equations Set 1 and Equation Set 3 above. The derivation for the concurrent computation of decoding and reconstruction begins with an input image in full RGB pattern, and according to the Equation Set 1, a target pixel value can be obtained in the output (or target) image using:

$$R(X_t, Y_t) = R(x, y) = \begin{bmatrix} 1 - \Delta x - \Delta y + \Delta x \Delta y \\ \Delta x - \Delta x \Delta y \\ \Delta y - \Delta x \Delta y \\ \Delta x \Delta y \end{bmatrix}' \cdot \begin{bmatrix} R(X, Y) \\ R(X+1, Y) \\ R(X, Y+1) \\ R(X+1, Y+1) \end{bmatrix}$$

However, in the disclosed implementation, the source image is a mosaic, as well as the target image. Since the images are mosaics (e.g., Bayer) patterns, this means that the source image in not a full RGB pattern. Demosaicing is used to obtain an interpolated (or "virtual") full RGB pattern. Thus, for the above equation, there can be four scenarios, described in general form as the following.

Scenario S1 is where $R(X, Y)$ is a real pixel, while $R(X+1, Y)$, $R(X, Y+1)$, and $R(X+1, Y+1)$ are not real pixels in the Bayer pattern of the source image. These non-real pixel values are then calculated from other real pixels, such that, $$R(X+1, Y) = \frac{R(X, Y) + R(X+2, Y)}{2}$$

$$R(X, Y+1) = \frac{R(X, Y) + R(X, Y+2)}{2}$$

$$R(X+1, Y+1) = \frac{R(X, Y) + R(X+2, Y) + R(X, Y+2) + R(X+2, Y+2)}{4}$$

Scenario S2 is where $R(X+1, Y)$ is a real pixel, while $R(X, Y)$, $R(X, Y+1)$, and $R(X+1, Y+1)$ are non-real pixels in the Bayer pattern, and are calculated from other real pixels.

$$R(X, Y) = \frac{R(X-1, Y) + R(X+1, Y)}{2}$$

$$R(X, Y+1) = \frac{R(X-1, Y) + R(X+1, Y) + R(X-1, Y+2) + R(X+1, Y+2)}{4}$$

$$R(X+1, Y+1) = \frac{R(X+1, Y) + R(X+1, Y+2)}{2}$$

Scenario S3 is where R(X, Y+1) is a real pixel, while R(X, Y), R(X+1, Y), and R(X+1, Y+1) are non-real pixels in the Bayer pattern, and are calculated from other real pixels.

$$R(X, Y) = \frac{R(X, Y-1) + R(X, Y+1)}{2}$$

$$R(X+1, Y) = \frac{R(X, Y-1) + R(X+2, Y-1) + R(X, Y+1) + R(X+2, Y+1)}{4}$$

$$R(X+1, Y+1) = \frac{R(X, Y+1) + R(X+2, Y+1)}{2}$$

Scenario S4 is where, R(X+1, Y+1) is a real pixel, while R(X, Y), R(X+1, Y), and R(X, Y+1) are non-real pixels in the Bayer pattern, and are calculated from other real pixels.

$$R(X, Y) = \frac{R(X-1, Y-1) + R(X+1, Y-1) + R(X-1, Y+1) + R(X+1, Y+1)}{4}$$

$$R(X+1, Y) = \frac{R(X+1, Y-1) + R(X+1, Y+1)}{2}$$

$$R(X, Y+1) = \frac{R(X-1, Y+1) + R(X+1, Y+1)}{2}$$

Making the substitutions in the Equation Set 1 for the red (R) pixels, the scenarios are the following. In scenario S1, $$R(X_t, Y_t) = R(x, y) = \begin{bmatrix} 1 - \Delta x - \Delta y + \Delta x \Delta y \\ \Delta x - \Delta x \Delta y \\ \Delta y - \Delta x \Delta y \\ \Delta x \Delta y \end{bmatrix}' \cdot \begin{bmatrix} R(X, Y) \\ R(X+1, Y) \\ R(X, Y+1) \\ R(X+1, Y+1) \end{bmatrix} =$$

$$\begin{bmatrix} 1 - \Delta x - \Delta y + \Delta x \Delta y \\ \Delta x - \Delta x \Delta y \\ \Delta y - \Delta x \Delta y \\ \Delta x \Delta y \end{bmatrix}' \cdot \begin{bmatrix} R(X, Y)R(X, Y) + \\ \frac{R(X+2, Y)}{2} \\ \frac{R(X, Y) + R(X, Y+2)}{2} \\ \frac{R(X, Y) + R(X+2, Y) + R(X, Y+2) + R(X+2, Y+2)}{4} \end{bmatrix} =$$

$$\begin{bmatrix} 1 - \frac{\Delta x}{2} - \frac{\Delta y}{2} + \frac{\Delta x \Delta y}{4} \\ \frac{\Delta x}{2} - \frac{\Delta x \Delta y}{4} \\ \frac{\Delta y}{2} - \frac{\Delta x \Delta y}{4} \\ \frac{\Delta x \Delta y}{4} \end{bmatrix}' \cdot \begin{bmatrix} R(X, Y) \\ R(X+2, Y) \\ R(X, Y+2) \\ R(X+2, Y+2) \end{bmatrix}$$

In scenario S2, $$R(X_t, Y_t) = R(x, y) = \begin{bmatrix} 1 - \Delta x - \Delta y + \Delta x \Delta y \\ \Delta x - \Delta x \Delta y \\ \Delta y - \Delta x \Delta y \\ \Delta x \Delta y \end{bmatrix}' \cdot \begin{bmatrix} R(X, Y) \\ R(X+1, Y) \\ R(X, Y+1) \\ R(X+1, Y+1) \end{bmatrix} =$$

$$\begin{bmatrix} 1 - \Delta x - \Delta y + \Delta x \Delta y \\ \Delta x - \Delta x \Delta y \\ \Delta y - \Delta x \Delta y \\ \Delta x \Delta y \end{bmatrix}' \cdot \begin{bmatrix} \frac{R(X-1, Y) + R(X+1, Y)}{2} \\ R(X+1, Y)R(X-1, Y) + \\ \frac{R(X+1, Y) + R(X-1, Y+2) + R(X+1, Y+2)}{4} \\ \frac{R(X+1, Y) + R(X+1, Y+2)}{2} \end{bmatrix} =$$

$$\begin{bmatrix} \frac{1}{2} - \frac{\Delta x}{2} - \frac{\Delta y}{4} + \frac{\Delta x \Delta y}{4} \\ \frac{1}{2} + \frac{\Delta x}{2} - \frac{\Delta y}{4} - \frac{\Delta x \Delta y}{4} \\ \frac{\Delta y}{4} - \frac{\Delta x \Delta y}{4} \\ \frac{\Delta y}{4} + \frac{\Delta x \Delta y}{4} \end{bmatrix}' \cdot \begin{bmatrix} R(X-1, Y) \\ R(X+1, Y) \\ R(X-1, Y+2) \\ R(X+1, Y+2) \end{bmatrix}$$

In scenario S3, $$R(X_t, Y_t) = R(x, y) = \begin{bmatrix} 1 - \Delta x - \Delta y + \Delta x \Delta y \\ \Delta x - \Delta x \Delta y \\ \Delta y - \Delta x \Delta y \\ \Delta x \Delta y \end{bmatrix}' \cdot \begin{bmatrix} R(X, Y) \\ R(X+1, Y) \\ R(X, Y+1) \\ R(X+1, Y+1) \end{bmatrix} =$$

$$\begin{bmatrix} 1 - \Delta x - \Delta y + \Delta x \Delta y \\ \Delta x - \Delta x \Delta y \\ \Delta y - \Delta x \Delta y \\ \Delta x \Delta y \end{bmatrix}' \cdot \begin{bmatrix} \frac{R(X, Y-1) + R(X, Y+1)}{2} \\ \frac{R(X, Y-1) + R(X+2, Y-1) + R(X, Y+1) + R(X+2, Y+1)}{4} \\ R(X, Y+1)R(X, Y+1) + \\ \frac{R(X+2, Y+1)}{2} \end{bmatrix} =$$

$$\begin{bmatrix} \frac{1}{2} - \frac{\Delta x}{4} - \frac{\Delta y}{2} + \frac{\Delta x \Delta y}{4} \\ \frac{\Delta x}{4} - \frac{\Delta x \Delta y}{4} \\ \frac{1}{2} - \frac{\Delta x}{4} + \frac{\Delta y}{2} - \frac{\Delta x \Delta y}{4} \\ \frac{\Delta x}{4} + \frac{\Delta x \Delta y}{4} \end{bmatrix}' \cdot \begin{bmatrix} R(X, Y-1) \\ R(X+2, Y-1) \\ R(X, Y+1) \\ R(X+2, Y+1) \end{bmatrix}$$

In scenario S4, $$R(X_t, Y_t) = R(x, y) = \begin{bmatrix} 1 - \Delta x - \Delta y + \Delta x \Delta y \\ \Delta x - \Delta x \Delta y \\ \Delta y - \Delta x \Delta y \\ \Delta x \Delta y \end{bmatrix}' \cdot \begin{bmatrix} R(X, Y) \\ R(X+1, Y) \\ R(X, Y+1) \\ R(X+1, Y+1) \end{bmatrix} =$$

$$\begin{bmatrix} 1-\Delta x-\Delta y+\Delta x\Delta y \\ \Delta x-\Delta x\Delta y \\ \Delta y-\Delta x\Delta y \\ \Delta x\Delta y \end{bmatrix}' \cdot \begin{bmatrix} \frac{R(X-1,Y-1)+R(X+1,Y-1)+}{R(X-1,Y+1)+R(X+1,Y+1)} \\ \frac{4}{R(X+1,Y-1)+R(X+1,Y+1)} \\ \frac{2}{R(X-1,Y+1)+R(X+1,Y+1)} \\ \frac{2}{R(X+1,Y+1)} \end{bmatrix} =$$

$$\begin{bmatrix} \frac{1}{4}-\frac{\Delta x}{4}-\frac{\Delta y}{4}+\frac{\Delta x\Delta y}{4} \\ \frac{1}{4}+\frac{\Delta x}{4}-\frac{\Delta y}{4}-\frac{\Delta x\Delta y}{4} \\ \frac{1}{4}-\frac{\Delta x}{4}+\frac{\Delta y}{4}-\frac{\Delta x\Delta y}{4} \\ \frac{1}{4}+\frac{\Delta x}{4}+\frac{\Delta y}{4}+\frac{\Delta x\Delta y}{4} \end{bmatrix}' \cdot \begin{bmatrix} R(X-1,Y-1) \\ R(X+1,Y-1) \\ R(X-1,Y+1) \\ R(X+1,Y+1) \end{bmatrix}$$

FIG. 3 illustrates the resulting equations of the above scenarios 300 for red pixels. Although derived for red pixels, the above scenarios also apply to the blue (B) pixels. Equation 302 (also referred to as scenario S1) calculates the color values for interpolated pixels when the real pixel is in a top-left position of a 4-pixel group. Equation 304 (also referred to as scenario S2) calculates the color values for interpolated pixels when the real pixel is in a top-right position of a 4-pixel group. Equation 306 (also referred to as scenario S3) calculates the color values for interpolated pixels when the real pixel is in a bottom-left position of a 4-pixel group. Equation 308 (also referred to as scenario S4) calculates the color values for interpolated pixels when the real pixel is in a bottom-right position of a 4-pixel group.

Figure 4:
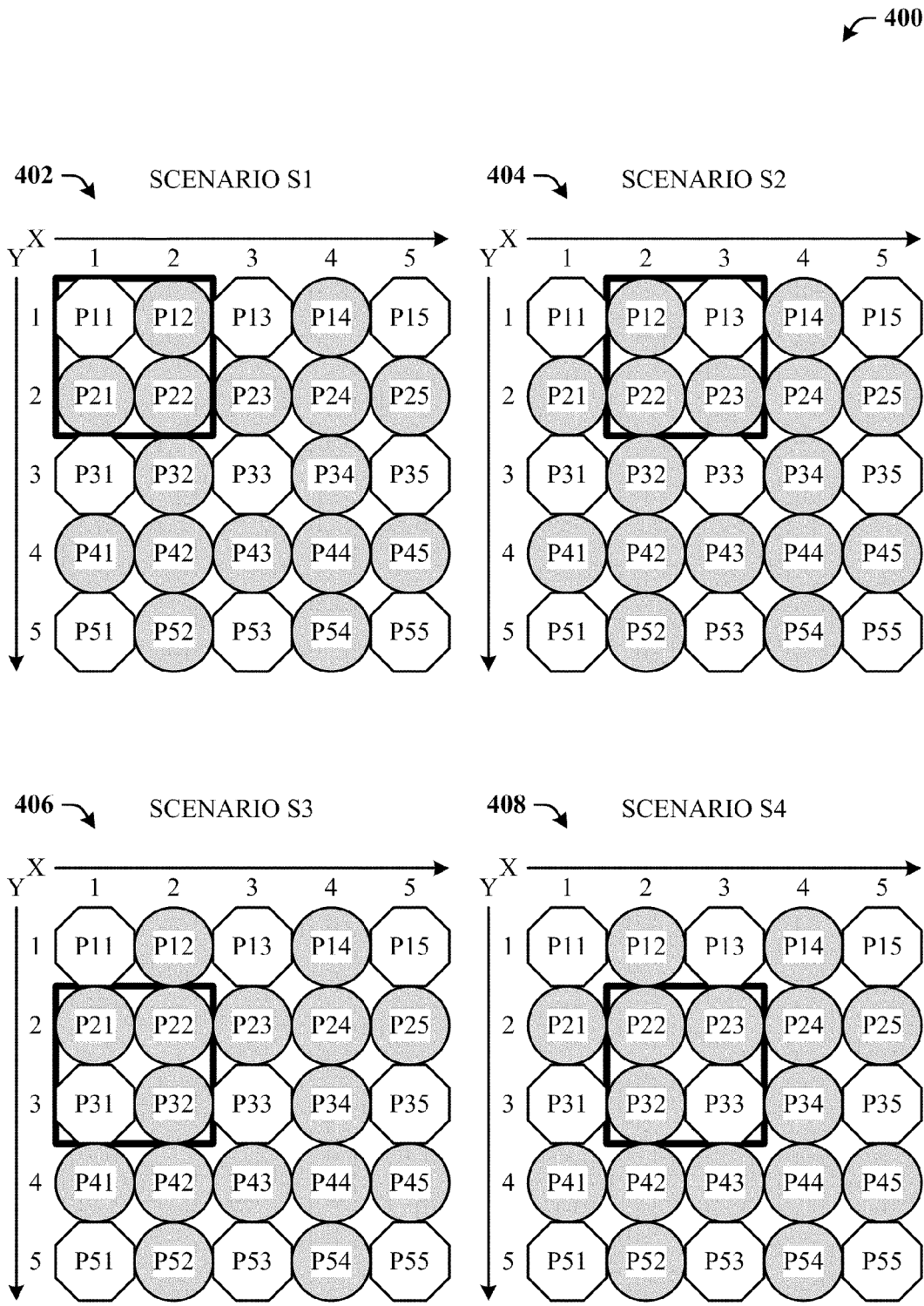
FIG. 4 illustrates the scenarios of FIG. 3 on pixel sets.

FIG. 4 illustrates the scenarios of FIG. 3 on pixel sets 400. On a first pixel set 402, the first scenario S1 selects equation 302, since the real pixel P11 is in the top-left corner of three adjacent interpolated pixels P12, P21, and P22. On a second pixel set 404, the second scenario S2 selects equation 304, since the real pixel P13 is in the top-right corner of three adjacent interpolated pixels P12, P22, and P23. On a third pixel set 406, the third scenario S3 selects equation 306, since the real pixel P31 is in the bottom-left corner of three adjacent interpolated pixels P21, P22, and P32. On a fourth pixel set 408, the fourth scenario S4 selects equation 308, since the real pixel P33 is in the bottom-right corner of three adjacent interpolated pixels P22, P23, and P32.

From above, it is known that in full RGB pattern reconstruction, the bilinear method uses the four adjacent real pixels of the same color to interpolate the target pixel value. In FIG. 4, it is also desirable to real source pixels are used to interpolate the target pixel value; however, three of the four adjacent pixels are not real pixels captured from sensor, but virtual pixels interpolated from other real pixels. Thus, there can be four different pixel distributions for performing interpolation for reconstruction.

FIG. 5 illustrates the scenarios 500 for the green pixel reconstruction in a Bayer pattern. The scenarios 500 include a first scenario 502 and a second scenario 504. The first scenario S1 involves real pixels in the top-left and bottom-right positions, and the second scenario S2 involves real pixels in the top-right and bottom-left positions.

Although not derived here, the derivation method for the green pixel reconstruction is similar to the derivation applied for the red and blue pixels. The number of green pixels in the Bayer pattern is twice the number of the red or blue pixels. For green pixels, the relevant pixel in the source image may locate in the evaluation box of scenario S1 or scenario S2. Combining the equations for bilinear reconstruction and demosaicing, the target green pixel values can be calculated as in Equation 3 below.

For pixels located in the evaluation box of scenario S1:

$$G(x,y) = \begin{bmatrix} \frac{\Delta x}{4}-\frac{\Delta x\Delta y}{4} \\ 1-\frac{3\Delta x}{4}-\frac{3\Delta y}{4}+\frac{\Delta x\Delta y}{2} \\ \frac{\Delta x}{4}-\frac{\Delta x\Delta y}{4} \\ \frac{\Delta y}{4}-\frac{\Delta x\Delta y}{4} \\ \frac{\Delta x}{4}+\frac{\Delta y}{4}+\frac{\Delta x\Delta y}{2} \\ \frac{\Delta y}{4}-\frac{\Delta x\Delta y}{4} \end{bmatrix}' \cdot \begin{bmatrix} P_{13} \\ P_{22} \\ P_{24} \\ P_{31} \\ P_{33} \\ P_{42} \end{bmatrix}$$

For pixels located in the evaluation box of scenario S2:

$$G(x,y) = \begin{bmatrix} \frac{1}{4}-\frac{\Delta x}{4}-\frac{\Delta y}{4}+\frac{\Delta x\Delta y}{4} \\ \frac{1}{4}-\frac{\Delta x}{4}-\frac{\Delta y}{4}+\frac{\Delta x\Delta y}{4} \\ \frac{1}{4}+\frac{3\Delta x}{4}-\frac{\Delta y}{4}-\frac{\Delta x\Delta y}{2} \\ \frac{1}{4}-\frac{\Delta x}{4}+\frac{3\Delta y}{4}-\frac{\Delta x\Delta y}{2} \\ \frac{\Delta x\Delta y}{4} \\ \frac{\Delta x\Delta y}{4} \end{bmatrix}' \cdot \begin{bmatrix} P_{13} \\ P_{22} \\ P_{24} \\ P_{33} \\ P_{35} \\ P_{44} \end{bmatrix}$$

where $[x, y, 1]'=T\cdot[X_t, Y_t, 1]'$; $X=[x]$ and $Y=[y]$; $[x]$ means the largest integer that is smaller than x, and $\Delta x=x-X$ and $\Delta y=y-Y$.

In other words, scenario S1 calculates the interpolated pixels P23 and P32 based on real pixels P13, P22, P24, P31, P33, and P42. The second scenario S2 calculates the interpolated pixels P23 and P34 based on real pixels P13, P22, P24, P33, P35, and P44.

Figure 6:
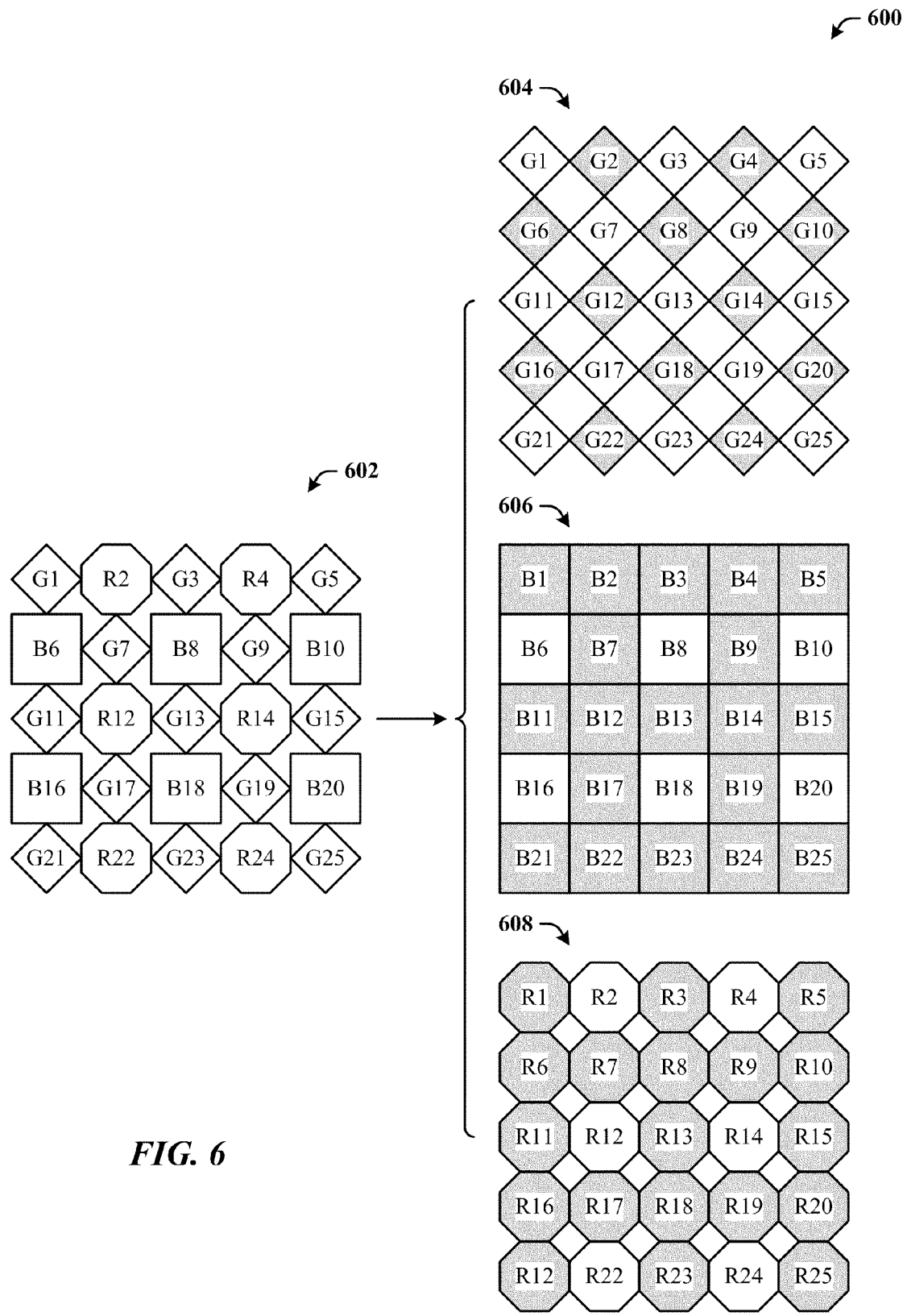
FIG. 6 illustrates a demosaicing process that decodes a mosaic and the equations for generating interpolated pixels from the real pixels.

FIG. 6 illustrates a demosaicing process 600 that decodes a mosaic 602 and the equations for generating interpolated pixels from the real pixels. The mosaic 602 includes red pixels (denoted as octagons), blue pixels (denoted as squares) and green pixels (denoted as diamonds). The mosaic 602 is decoded into the three base (or constituent) color patterns: a green (G) pixel pattern 604, a blue (B) pixel pattern 606, and a red (R) pixel pattern 608. In the green color pattern 604, the real pixels are, for example, G1,G3,G5, etc. The Equation Set 3 describes the general methods for computing the interpolated pixels G2,G4,G6, etc. For example, the interpolated pixel color value for G2 is calculated as (G1+G3)/2; the interpolated pixel color value for G8 is calculated as (G3+G7+G9+G13)/4, and so on, for all interpolated pixels. The same Equation Set 3 applies for calculating the interpolated color values for the blue pixel pattern 606 and the red pixel pattern 608.

The following example applies one of the equation scenarios above for red pixel reconstruction for Bayer pattern. The pixels represented by circles with cross-hatching are the virtual target pixels interpolated from adjacent real source pixels by the reconstruction method. The pixels represented as octagons are the real (original) red pixels of the source image captured by the image sensor. In other words, P11 is the real pixel that captured from sensor, and P12, P21, P22 are the virtual target pixels that are interpolated from other real source pixels. For example, P11=P11, P12=(P11+P13)/2; P21=(P11+P31)/2; and, P22=(P11+P13+P31+P33)/4.

The transform matrix T can be the following, for example.

$$T = \begin{bmatrix} 1 & 0 & 0.5 \\ 0 & 1 & 0.5 \\ 0 & 0 & 1 \end{bmatrix}$$

Accordingly, if $X_t=1$ and $Y_t=1$, then x=1.5 and y=1.5 (using Equation Set 1) such that the source real pixel becomes P11. Thus, the first scenario S1 applies where the real pixel is in the top-left corner. In another example, if $X_t=2$ and $Y_t=2$, then x=2.5 and y=2.5 (using Equation Set 1), and real pixel P22 is in bottom-right corner such that the equation of scenario S4 applies. This process is the same for the blue pixels.

For pixels located in the evaluation box of scenario S1:

$$R(x,y) = \begin{bmatrix} 1 - \frac{\Delta x}{2} - \frac{\Delta y}{2} + \frac{\Delta x \Delta y}{4} \\ \frac{\Delta x}{2} - \frac{\Delta x \Delta y}{4} \\ \frac{\Delta y}{2} - \frac{\Delta x \Delta y}{4} \\ \frac{\Delta x \Delta y}{4} \end{bmatrix}' \cdot \begin{bmatrix} P_{11} \\ P_{13} \\ P_{31} \\ P_{33} \end{bmatrix}$$

For pixels located in the evaluation box of scenario S2:

$$R(x,y) = \begin{bmatrix} \frac{1}{2} - \frac{\Delta x}{2} - \frac{\Delta y}{4} + \frac{\Delta x \Delta y}{4} \\ \frac{1}{2} + \frac{\Delta x}{2} - \frac{\Delta y}{4} - \frac{\Delta x \Delta y}{4} \\ \frac{\Delta y}{4} - \frac{\Delta x \Delta y}{4} \\ \frac{\Delta y}{4} + \frac{\Delta x \Delta y}{4} \end{bmatrix}' \cdot \begin{bmatrix} P_{11} \\ P_{13} \\ P_{31} \\ P_{33} \end{bmatrix}$$

For pixels located in the evaluation box of scenario S3:

$$R(x,y) = \begin{bmatrix} \frac{1}{2} - \frac{\Delta x}{4} - \frac{\Delta y}{2} + \frac{\Delta x \Delta y}{4} \\ \frac{\Delta y}{4} - \frac{\Delta x \Delta y}{4} \\ \frac{1}{2} - \frac{\Delta x}{4} + \frac{\Delta y}{2} - \frac{\Delta x \Delta y}{4} \\ \frac{\Delta y}{4} + \frac{\Delta x \Delta y}{4} \end{bmatrix}' \cdot \begin{bmatrix} P_{11} \\ P_{13} \\ P_{31} \\ P_{33} \end{bmatrix}$$

For pixels located in the evaluation box of scenario S4:

$$R(x,y) = \begin{bmatrix} \frac{1}{4} - \frac{\Delta x}{4} - \frac{\Delta y}{4} + \frac{\Delta x \Delta y}{4} \\ \frac{1}{4} + \frac{\Delta x}{4} - \frac{\Delta y}{4} - \frac{\Delta x \Delta y}{4} \\ \frac{1}{4} - \frac{\Delta x}{4} + \frac{\Delta y}{4} - \frac{\Delta x \Delta y}{4} \\ \frac{1}{4} + \frac{\Delta x}{4} + \frac{\Delta y}{4} + \frac{\Delta x \Delta y}{4} \end{bmatrix}' \cdot \begin{bmatrix} P_{11} \\ P_{13} \\ P_{31} \\ P_{33} \end{bmatrix}$$

where $[x, y, 1]' = T \cdot [X_t, Y_t, 1]'$; X=[x], Y=[y]; [x] means the largest integer that is smaller than x, and $\Delta x = x - X$, $\Delta y = y - Y$.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of inter-related states or events, such as in a state diagram. Moreover, not all acts illustrated in a methodology may be required for a novel implementation.

Figure 7:
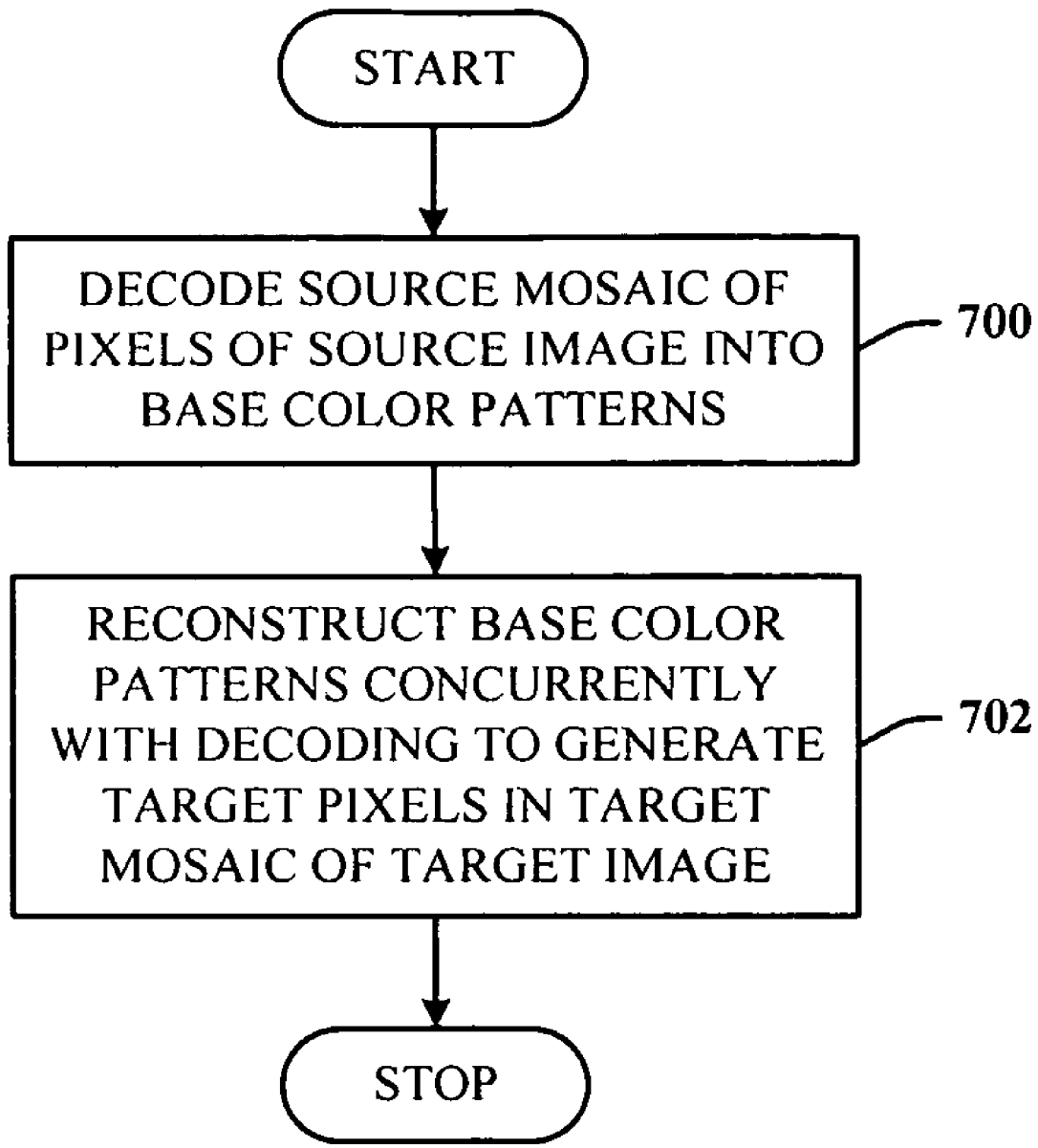
FIG. 7 illustrates a method of processing an image.

FIG. 7 illustrates a method of processing an image. At 700, a source mosaic of pixels of a source image is decoded into base color patterns. At 702, the base color patterns are reconstructed concurrently with the decoding to generate target pixels in a target mosaic of a target image. In other words, the target mosaic is reconstructed directly from the input mosaic.

Figure 8:
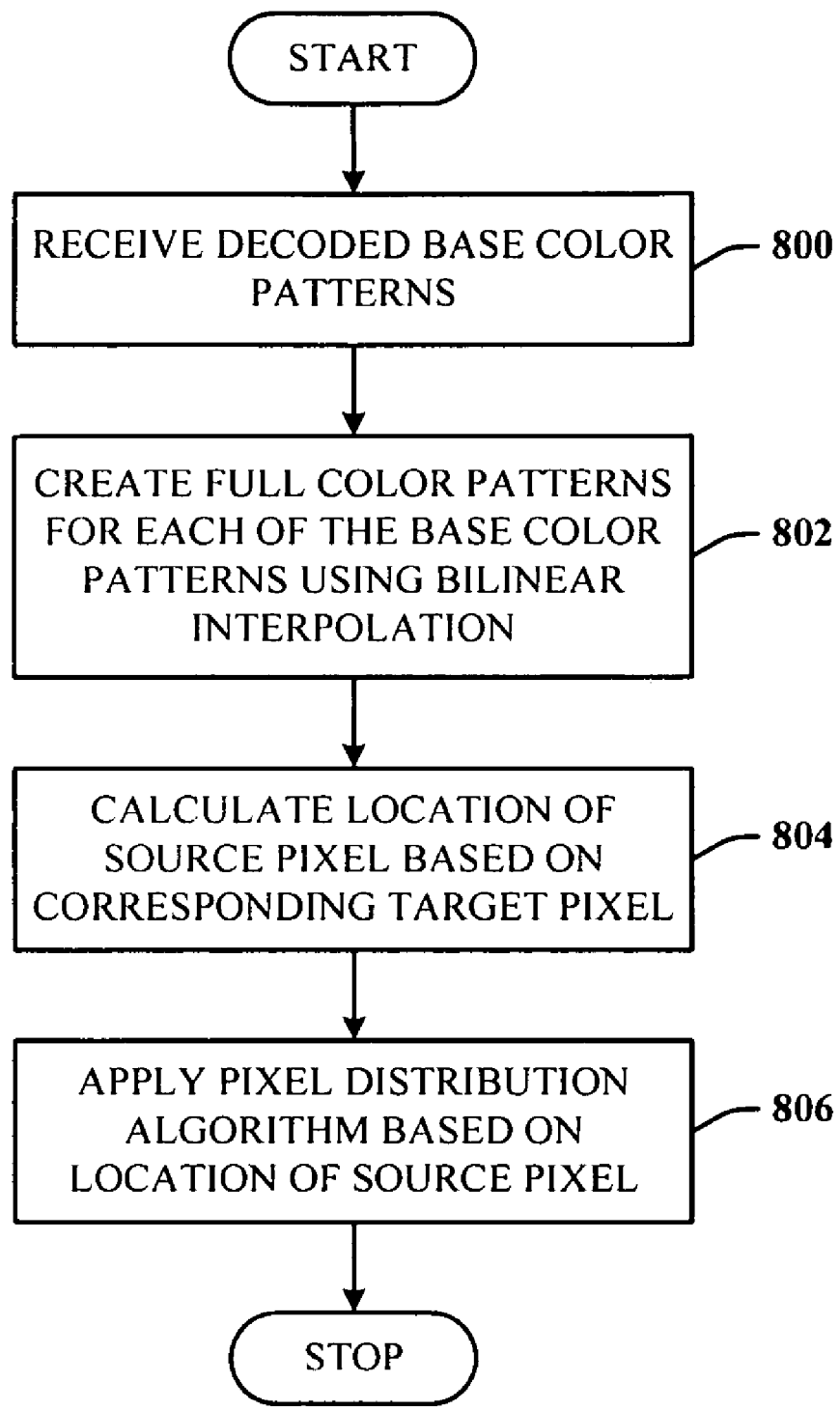
FIG. 8 illustrates a method of reconstructing a mosaic pattern.

FIG. 8 illustrates a method of reconstructing a mosaic pattern. At 800, decoded base color patterns are received. At 802, a full color pattern is created for each of the base color patterns using bilinear interpolation. At 804, the location of the source pixel is calculated based on the corresponding target pixel. At 806, a pixel distribution algorithm is applied based on the location of the source (real) pixel.

Figure 9:
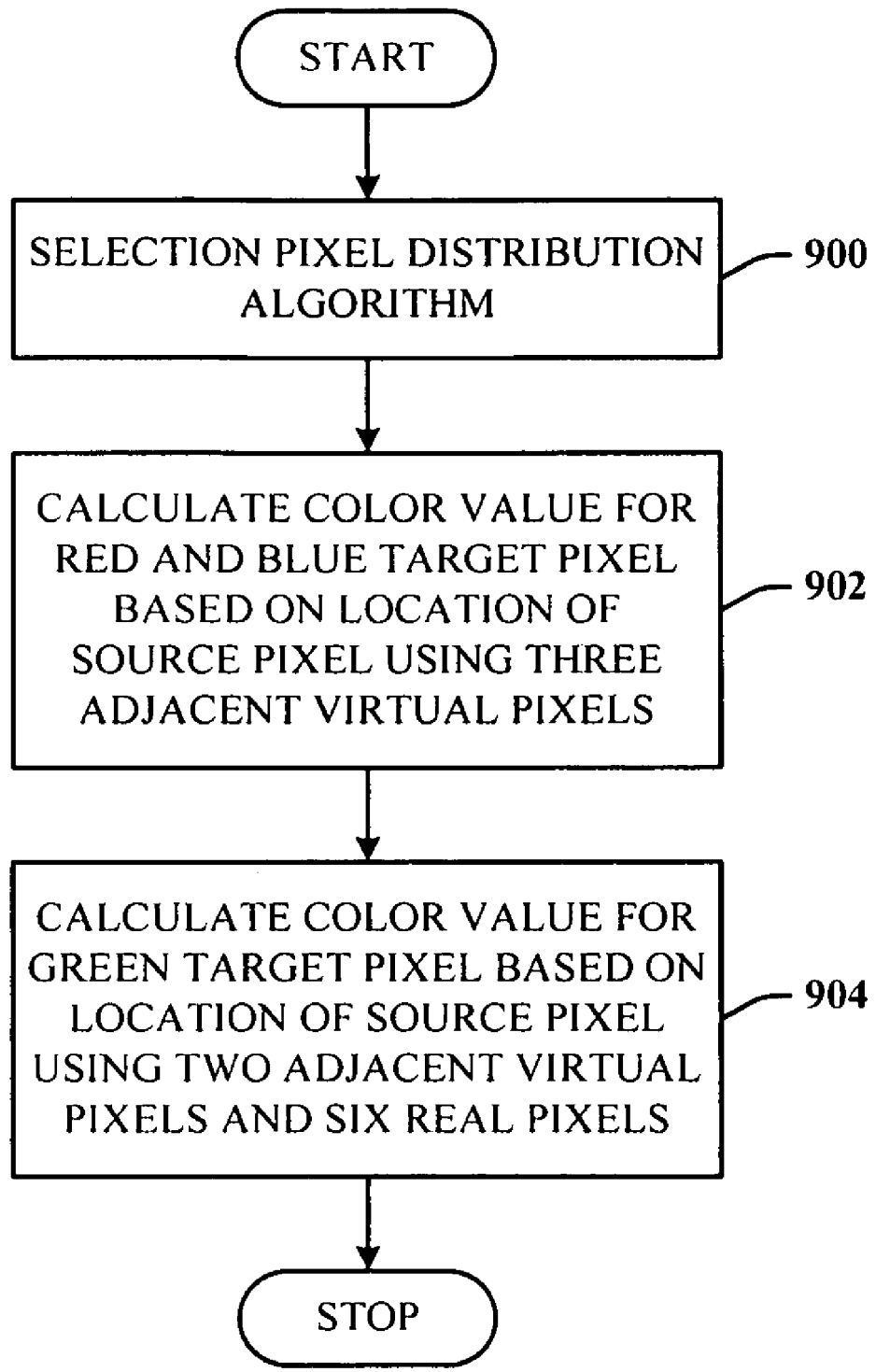
FIG. 9 illustrates a method of applying pixel distribution algorithms.

FIG. 9 illustrates a method of applying pixel distribution algorithms. At 900, a pixel distribution algorithm is selected. At 902, the color value for the red and blue target pixels is calculated based on the location of the source pixel using three adjacent virtual pixels. At 904, the color value for the green target pixels is calculated based on the location of the six source pixels and using two adjacent virtual pixels.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 10:
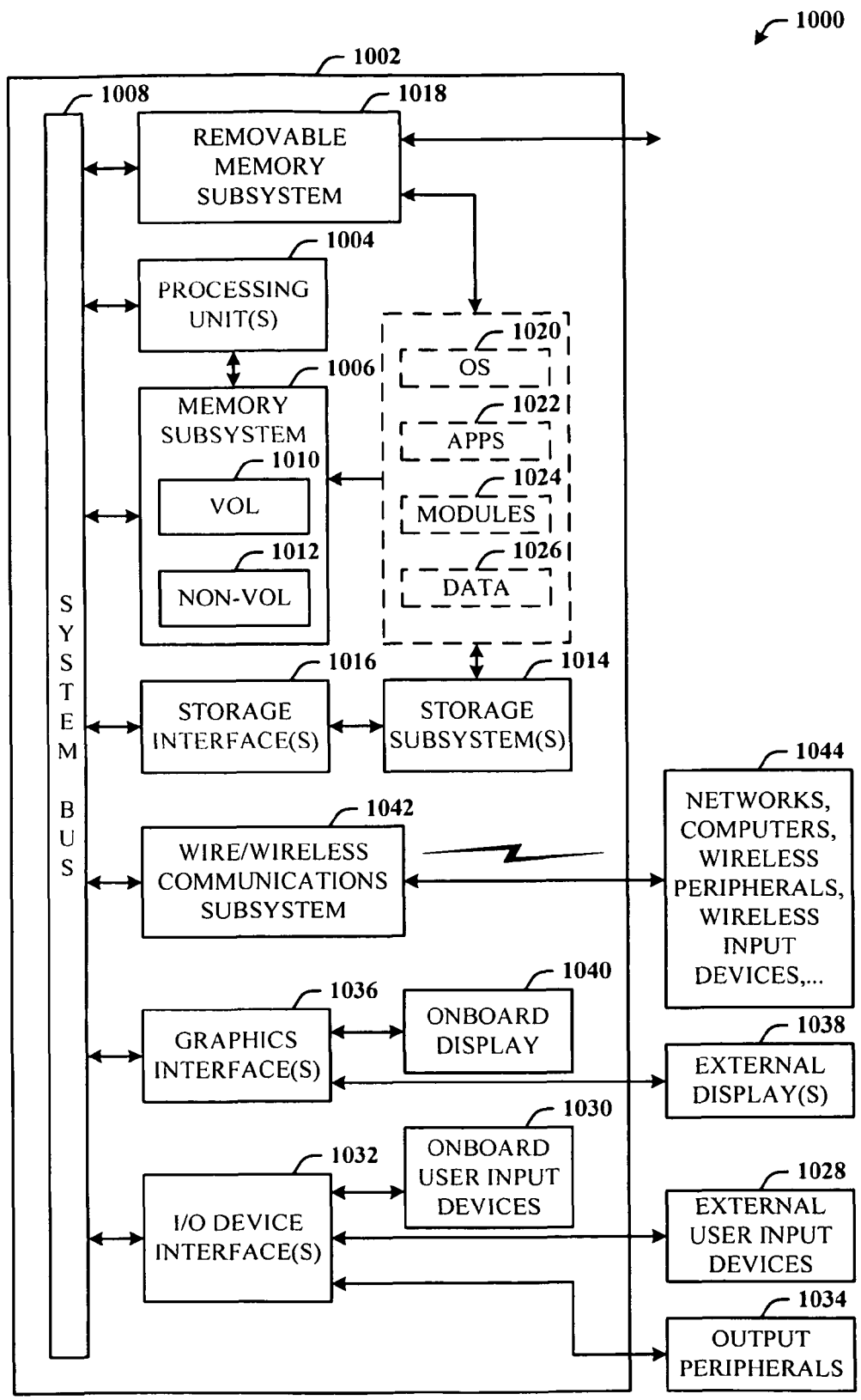
FIG. 10 illustrates a block diagram of a computing system operable to execute mosaic reconstruction in accordance with the disclosed architecture.

Referring now to FIG. 10, there is illustrated a block diagram of a computing system 1000 operable to execute mosaic reconstruction in accordance with the disclosed architecture. In order to provide additional context for various aspects thereof, FIG. 10 and the following discussion are intended to provide a brief, general description of the suitable computing system 1000 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 1000 for implementing various aspects includes the computer 1002 having processing unit(s) 1004, a system memory 1006, and a system bus 1008. The processing unit(s) 1004 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 1006 can include volatile (VOL) memory 1010 (e.g., random access memory (RAM)) and non-volatile memory (NON-VOL) 1012 (e.g., ROM, EPROM, EEPROM, etc.). A basic input/output system (BIOS) can be stored in the non-volatile memory 1012, and includes the basic routines that facilitate the communication of data and signals between components within the computer 1002, such as during startup. The volatile memory 1010 can also include a high-speed RAM such as static RAM for caching data.

The system bus 1008 provides an interface for system components including, but not limited to, the memory subsystem 1006 to the processing unit(s) 1004. The system bus 1008 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 1002 further includes storage subsystem(s) 1014 and storage interface(s) 1016 for interfacing the storage subsystem(s) 1014 to the system bus 1008 and other desired computer components. The storage subsystem(s) 1014 can include one or more of a hard disk drive (HDD), a magnetic floppy disk drive (FDD), and/or optical disk storage drive (e.g., a CD-ROM drive DVD drive), for example. The storage interface(s) 1016 can include interface technologies such as EIDE, ATA, SATA, and IEEE 1394, for example.

One or more programs and data can be stored in the memory subsystem 1006, a removable memory subsystem 1018 (e.g., flash drive form factor technology), and/or the storage subsystem(s) 1014, including an operating system 1020, one or more application programs 1022, other program modules 1024, and program data 1026. The one or more application programs 1022, other program modules 1024, and program data 1026 can include the disclosed decoding and reconstruction architecture for direct mosaic-to-mosaic reconstruction. Accordingly, the one or more application programs 1022, other program modules 1024, and program data 1026 can include the system and elements of FIG. 1, FIG. 2, equations 300, pixel interpolation distributions of FIG. 4 and FIG. 5, and methods of FIGS. 7-9. Alternatively, or in combination therewith, all or portions of the architecture can be embodied in hardware such as a FPGA, for example.

Generally, programs include routines, methods, data structures, other software components, etc., that perform particular tasks or implement particular abstract data types. All or portions of the operating system 1020, applications 1022, modules 1024, and/or data 1026 can also be cached in memory such as the volatile memory 1010, for example. It is to be appreciated that the disclosed architecture can be implemented with various commercially available operating systems or combinations of operating systems (e.g., as virtual machines).

The storage subsystem(s) 1014 and memory subsystems (1006 and 1018) serve as computer readable media for volatile and non-volatile storage of data, data structures, computer-executable instructions, and so forth. Computer readable media can be any available media that can be accessed by the computer 1002 and includes volatile and non-volatile media, removable and non-removable media. For the computer 1002, the media accommodate the storage of data in any suitable digital format. It should be appreciated by those skilled in the art that other types of computer readable media can be employed such as zip drives, magnetic tape, flash memory cards, cartridges, and the like, for storing computer executable instructions for performing the novel methods of the disclosed architecture.

A user can interact with the computer 1002, programs, and data using external user input devices 1028 such as a keyboard and a mouse. Other external user input devices 1028 can include a microphone, an IR (infrared) remote control, a joystick, a game pad, camera recognition systems, a stylus pen, touch screen, gesture systems (e.g., eye movement, head movement, etc.), and/or the like. The user can interact with the computer 1002, programs, and data using onboard user input devices 1030 such a touchpad, microphone, keyboard, etc., where the computer 1002 is a portable computer, for example. These and other input devices are connected to the processing unit(s) 1004 through input/output (I/O) device interface(s) 1032 via the system bus 1008, but can be connected by other interfaces such as a parallel port, IEEE 1394 serial port, a game port, a USB port, an IR interface, etc. The I/O device interface(s) 1032 also facilitate the use of output peripherals 1034 such as printers, audio devices, camera devices, and so on, such as a sound card and/or onboard audio processing capability.

One or more graphics interface(s) 1036 (also commonly referred to as a graphics processing unit (GPU)) provide graphics and video signals between the computer 1002 and external display(s) 1038 (e.g., LCD, plasma) and/or onboard displays 1040 (e.g., for portable computer). The graphics interface(s) 1036 can also be manufactured as part of the computer system board.

The computer 1002 can operate in a networked environment (e.g., IP) using logical connections via a wire/wireless communications subsystem 1042 to one or more networks and/or other computers. The other computers can include workstations, servers, routers, personal computers, microprocessor-based entertainment appliance, a peer device or other common network node, and typically include many or all of the elements described relative to the computer 1002. The logical connections can include wire/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 1002 connects to the network via a wire/wireless communication subsystem 1042 (e.g., a network interface adapter, onboard transceiver subsystem, etc.) to communicate with wire/wireless networks, wire/wireless printers, wire/wireless input devices 1044, and so on. The computer 1002 can include a modem or has other means for establishing communications over the network. In a networked environment, programs and data relative to the computer 1002 can be stored in the remote memory/storage device, as is associated with a distributed system. It will be appreciated that the network connections shown are exemplary and other means of establishing a communications link between the computers can be used.

The computer 1002 is operable to communicate with wire/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented image processing system, comprising:
    a decoding component for decoding a source mosaic of pixels of a source image into source base color patterns; and
    a reconstruction component for reconstructing target pixels in a target mosaic of a target image directly from the source base color patterns,
    wherein the reconstruction component selects an interpolation algorithm that calculates a color value for a target pixel based on a source pixel distribution that includes real and interpolated source pixels.

2. The system of claim 1, wherein the mosaic of the source image and the mosaic of the target image are Bayer patterns.

3. The system of claim 1, wherein the pixel distribution includes three interpolated source pixels and a real pixel.

4. The system of claim 3, wherein the pixel distribution applies to red and blue base color patterns.

5. The system of claim 1 wherein the pixel distribution includes two interpolated source pixels and six real pixels.

6. The system of claim 5, wherein the pixel distribution applies to a green base color pattern, 7. A computer-implemented image processing system, comprising:
    a decoding component for decoding a source Bayer pattern of pixels of a source image into source base color patterns; and
    a reconstruction component for reconstructing target pixels in a target mosaic of a target image directly from the source base color patterns to generate target pixels in a target Bayer pattern of a target image, the reconstruction component selecting an interpolation algorithm that calculates an interpolated color value for a target pixel based on a real and interpolated pixel distribution in the base color patterns.

8. The system of claim 7, wherein the pixel distribution includes three interpolated source pixels and a real pixel.

9. The system of claim 8, wherein the pixel distribution applies to red and blue base color patterns.

10. The system of claim 7, wherein the pixel distribution includes two interpolated source pixels and six real pixels.

11. The system of claim 10, wherein the pixel distribution applies to a green base color pattern.

12. A computer-implemented nethod of processing an image, comprising:
    decoding a source mosaic of pixels of a source image into source base color patterns;
    reconstructing corresponding target base color patterns directly from the source color patterns to generate a target mosaic of a target image; and
    calculating location of a corresponding source pixel based on a target pixel and applying a pixel distribution algorithm based on location of the source pixel.

13. The method of claim 12, wherein the source mosaic and the target mosaic are a same color pattern of pixels.

14. The method of claim 12, further comprising creating full color patterns for the source base color patterns using bilinear interpolation.

15. The method of claim 12, wherein the pixel distribution algorithm calculates a color value for the target pixel based on three virtual pixels adjacent to the source pixel.

16. The method of claim 15, wherein the target pixel is blue or red.

17. The method of claim 12 wherein the pixel distribution algorithm calculates a color value for the target pixel based on two virtual pixels adjacent to six real pixels.

18. The method of claim 12, wherein the target pixel is green.

* * * * *

UNITED STATES PATENT AND TRADEMARK OFFICE
CERTIFICATE OF CORRECTION

| | | |
|---|---|---|
| PATENT NO. | : 8,165,394 B2 | Page 1 of 1 |
| APPLICATION NO. | : 12/212792 | |
| DATED | : April 24, 2012 | |
| INVENTOR(S) | : Cai et al. | |

It is certified that error appears in the above-identified patent and that said Letters Patent is hereby corrected as shown below:

In column 14, line 6, in Claim 6, delete "pattern," and insert -- pattern. --, therefor.

In column 14, line 27, in Claim 12, delete "nethod" and insert -- method --, therefor.

Signed and Sealed this
Ninth Day of October, 2012

David J. Kappos
*Director of the United States Patent and Trademark Office*